(12) United States Patent
Amma et al.

(10) Patent No.: US 8,444,815 B2
(45) Date of Patent: *May 21, 2013

(54) PULP COMPRISING POLYPYRIDOBISIMIDAZOLE AND OTHER POLYMERS AND METHODS OF MAKING SAME

(75) Inventors: Achim Amma, Richmond, VA (US); Kevin A. Mulcahy, Ashland, VA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 246 days.

This patent is subject to a terminal disclaimer.

(21) Appl. No.: 12/758,893

(22) Filed: Apr. 13, 2010

(65) Prior Publication Data

US 2010/0193143 A1 Aug. 5, 2010

Related U.S. Application Data

(62) Division of application No. 11/640,006, filed on Dec. 15, 2006, now Pat. No. 7,727,358.

(60) Provisional application No. 60/752,996, filed on Dec. 21, 2005.

(51) Int. Cl.
*D21H 13/10* (2006.01)
*D21F 11/00* (2006.01)

(52) U.S. Cl.
USPC ..... 162/157.3; 162/141; 162/146; 162/157.1; 162/164.3; 523/149

(58) Field of Classification Search
USPC .. 162/141, 146, 157.1, 157.3, 164.3; 523/149
See application file for complete search history.

(56) References Cited

U.S. PATENT DOCUMENTS

| 3,018,091 A | 1/1962 | Duggins |
| 3,756,908 A | 9/1973 | Gross |
| 4,472,241 A | 9/1984 | Provost |
| 5,674,969 A * | 10/1997 | Sikkema et al. ............. 528/183 |
| 2003/0022961 A1 * | 1/2003 | Kusaka et al. ............. 523/152 |

OTHER PUBLICATIONS

Brew et al., "The Properties of PIPD-Fibre/Epoxy Composites", Composites Science and Technology (1999), 59, pp. 1109-1116.
Van Der Jagt et al., "The Potential of a New Rigid-Rod Polymer Fibre ('M5') in Advanced Composite Structures", Polymer 40 (1999), pp. 1035-1044.
Klop et al., "XRD Study of the New Rigid-Rod Polymer Fibre PIPD", Polymer 39, No. 24 (1998), pp. 5987-5998.
Hageman, et al., "An Ab Initio Study of the Structural and Physical Properties of a Novel Rigid-Rod Polymer: PIPD", Polymer 40 (1999), pp. 1313-1323.
Research Disclosure 19037, "Manufacture and Applications of Pulp of 'KEVLAR' Aramid Fiber", pp. 74-75, Feb. 1980.

* cited by examiner

Primary Examiner — Jacob Thomas Minskey

(57) ABSTRACT

The present invention relates to fibrous pulp comprising a combination of polypyridobisimidazole fibrous structures and fibrous structures derived from another polymer. The invention further relates to processes for making such pulp and articles comprising the pulp.

7 Claims, 2 Drawing Sheets

PULP COMPRISING POLYPYRIDOBISIMIDAZOLE AND OTHER POLYMERS AND METHODS OF MAKING SAME

BACKGROUND OF THE INVENTION

1. Field of the Invention

This invention relates to fibrous pulp comprising a combination of polypyridobisimidazole fibrous structures and fibrous structures derived from another polymer. The invention further relates to processes for making such pulp and articles comprising the pulp

2. Description of Related Art

Fibrous and non fibrous reinforcement materials have been used for many years in friction products, fluid sealing products and other plastic or rubber products. Such reinforcement materials typically must exhibit high wear and heat resistance.

Polypyridobisimidazole polymer is a rigid rod polymer. Fiber made from this polymer (such as the polymer composition of which is referred to as PIPD and is known as the polymer used to make M5® fiber) is known to be useful in both cut and flame resistant protective apparel. Rigid-rod polymer fibers having strong hydrogen bonds between polymer chains, e.g., polypyridobisimidazoles, have been described in U.S. Pat. No. 5,674,969 to Sikkema et al. An example of a polypyridobisimidazole is poly(1,4-(2,5-dihydroxy)phenylene-2,6-pyrido[2,3-d:5,6-d]bisimidazole), which can be prepared by the condensation polymerization of tetraaminopyridine and 2,5-dihydroxyterephthalic acid in polyphosphoric acid. Sikkema discloses that pulp can be made from these fibers. Sikkema also describes that in making one- or two-dimensional objects, such as fibers, films, tapes, and the like, it is desired that polypyridobisimidazoles have a high molecular weight corresponding to a relative viscosity ("Vrel" or "hrel") of at least about 3.5, preferably at least about 5, and more particularly equal to or higher than about 10, when measured at a polymer concentration of 0.25 g/dl in methane sulfonic acid at 25° C. Sikkema also discloses that good fiber spinning results are obtained with poly[pyridobisimidazole-2,6-diyl(2,5-dihydroxy-p-phenylene)] having relative viscosities greater than about 12, and that relative viscosities of over 50 (corresponding to inherent viscosities greater than about 15.6 dl/g) can be achieved.

Research Disclosure 74-75, published February 1980, discloses the manufacture of pulp made from fibrillated KEVLAR® brand para-aramid fibers of variable lengths and use of such pulp as a reinforcement material in various applications. This publication discloses that pulp made from KEVLAR® brand para-aramid fibers can be used in sheet products alone, or in combination with fibers of other materials, such as NOMEX® brand meta-aramid, wood pulp, cotton and other natural cellulosics, rayon, polyester, polyolefin, nylon, polytetrafluoroethylene, asbestos and other minerals, fiberglass and other, ceramics, steel and other metals, and carbon. The publication also discloses the use of pulp from KEVLAR® brand para-aramid fiber alone, or with KEVLAR® brand para-aramid short staple, in friction materials to replace a fraction of the asbestos volume, with the remainder of the asbestos volume being replaced by fillers or other fibers.

U.S. Patent Application Publication 2003/0022961 (to Kusaka et al.) discloses friction materials made from a friction modifier, a binder and a fibrous reinforcement made of a mixture of (a) a dry aramid pulp and (b) wet aramid pulp, wood pulp or acrylic fiber pulp. Dry aramid pulp is defined as an aramid pulp obtained by "the dry fibrillation method". The dry fibrillation method is dry milling the aramid fibers between a rotary cutter and a screen to prepare the pulp. Wet aramid pulp is defined as an aramid pulp obtained by "the wet fibrillation method". The wet fibrillation method is milling short aramid fibers in water between two rotary discs to form fibrillated fibers and then dehydrating the fibrillated fibers, i.e., the pulp. Kusaka et al further disclose a method of mix-fibrillating fibers by first mixing plural types of organic fibers that fibrillate at a definite ratio, and then fibrillating the mixture to produce a pulp.

There is an ongoing need to provide alternative pulps that perform well in products and have an attractive cost to value relationship. Despite the numerous disclosures proposing alternative reinforcement materials, many of these proposed products do not adequately perform in use, cost significantly more than currently commercial products, or have other negative attributes. As such, there remains a need for reinforcement materials that exhibit improved value over other commercially available reinforcement materials in respect to high wear, strength and heat resistance at moderate cost.

BRIEF SUMMARY OF THE INVENTION

One embodiment of this invention relates to a fibrous pulp comprising a combination of polypyridobisimidazole fibrous structures and fibrous structures derived from another polymer, each of the fibrous structures having fibrils and stalks, and having an maximum dimension of no more than 15 mm, a mean length-weighted average length of no more than 2.0 mm, and the stalks and/or fibrils of the polypyridobisimidazole fibrous structures being substantially entangled with the fibrils and/or stalks of the fibrous structures derived from another polymer.

Another embodiment of this invention is process for making a fibrous pulp comprising fibrillated polypyridobisimidazole fibrous structures and fibrous structures derived from another polymer, comprising:

(a) combining pulp ingredients including:
 (1) rigid rod polypyridobisimidazole fiber having an average length of no more than 10 cm and being 3 to 40 weight percent of the total solids in the ingredients;
 (2) fiber derived from another polymer that is capable of being fibrillated and having an average length of no more than 10 cm and being 60 to 97 weight percent of the total solids in the ingredients; and
 (3) water;
(b) mixing the ingredients to a substantially uniform slurry;
(c) co-refining the slurry by simultaneously:
 (1) fibrillating, cutting and masticating the fiber in the pulp ingredients to form irregularly shaped fibrillated fibrous structures with stalks and fibrils; and
 (2) dispersing all solids such that the refined slurry is substantially uniform; and
(d) removing water from the refined slurry, thereby producing a fibrillated pulp with the fibrillated polypyridobisimidazole fibrous structures and fibrous structures derived from another polymer, the fibrous structures having an average maximum dimension of no more than 5 mm, a length-weighted average length of no more than 1.3 mm, the fibrils and/or stalks of the polypyridobisimidazole fibrous structures being substantially entangled with the fibrils and/or stalks of the fibrous structures derived from another polymer.

Still another embodiment of this invention is a process for making a fibrous pulp comprising fibrillated polypyridobisimidazole fibrous structures and fibrous structures derived from another polymer, comprising:

(a) combining ingredients including water and a first fiber from the group consisting of:
  (1) rigid rod polypyridobisimidazole fiber having an average length of no more than 10 cm and being 3 to 40 weight percent of the total solids in the ingredients; and
  (2) fiber derived from another polymer that is capable of being fibrillated and having an average length of no more than 10 cm and being 60 to 97 weight percent of the total solids in the ingredients;
(b) mixing the combined ingredients to a substantially uniform suspension;
(c) refining the suspension in a disc refiner thereby cutting the first fiber to have an average length of no more than 10 cm, and fibrillating and masticating at least some of the first fiber to irregularly shaped fibrillated fibrous structures;
(d) combining ingredients including the refined suspension, the second fiber of the group of (a) (1 and 2) having an average length of no more than 10 cm, and water, if necessary, to increase the water concentration to 95-99 weight percent of the total ingredients;
(e) mixing the ingredients, if necessary, to form a substantially uniform suspension;
(d) co-refining the mixed suspension by simultaneously:
  (1) fibrillating, cutting and masticating the fiber in the pulp ingredients to form irregularly shaped fibrillated fibrous structures with stalks and fibrils; and
  (2) dispersing all solids such that the refined slurry is substantially uniform; and
(f) removing water from the refined slurry, thereby producing a fibrillated pulp with the fibrillated polypyridobisimidazole fibrous structures and fibrous structures derived from another polymer, the fibrous structures having an average maximum dimension of no more than 5 mm, a length-weighted average length of no more than 1.3 mm,
the fibrils and/or stalks of the polypyridobisimidazole fibrous structures being substantially entangled with the fibrils and/or stalks of the fibrous structures derived from another polymer.

This invention is further directed to articles comprising the pulp of the present invention.

BRIEF DESCRIPTION OF THE DRAWING(S)

The invention can be more fully understood from the following detailed description thereof in connection with accompanying drawings described as follows.

GLOSSARY

Figure 1:
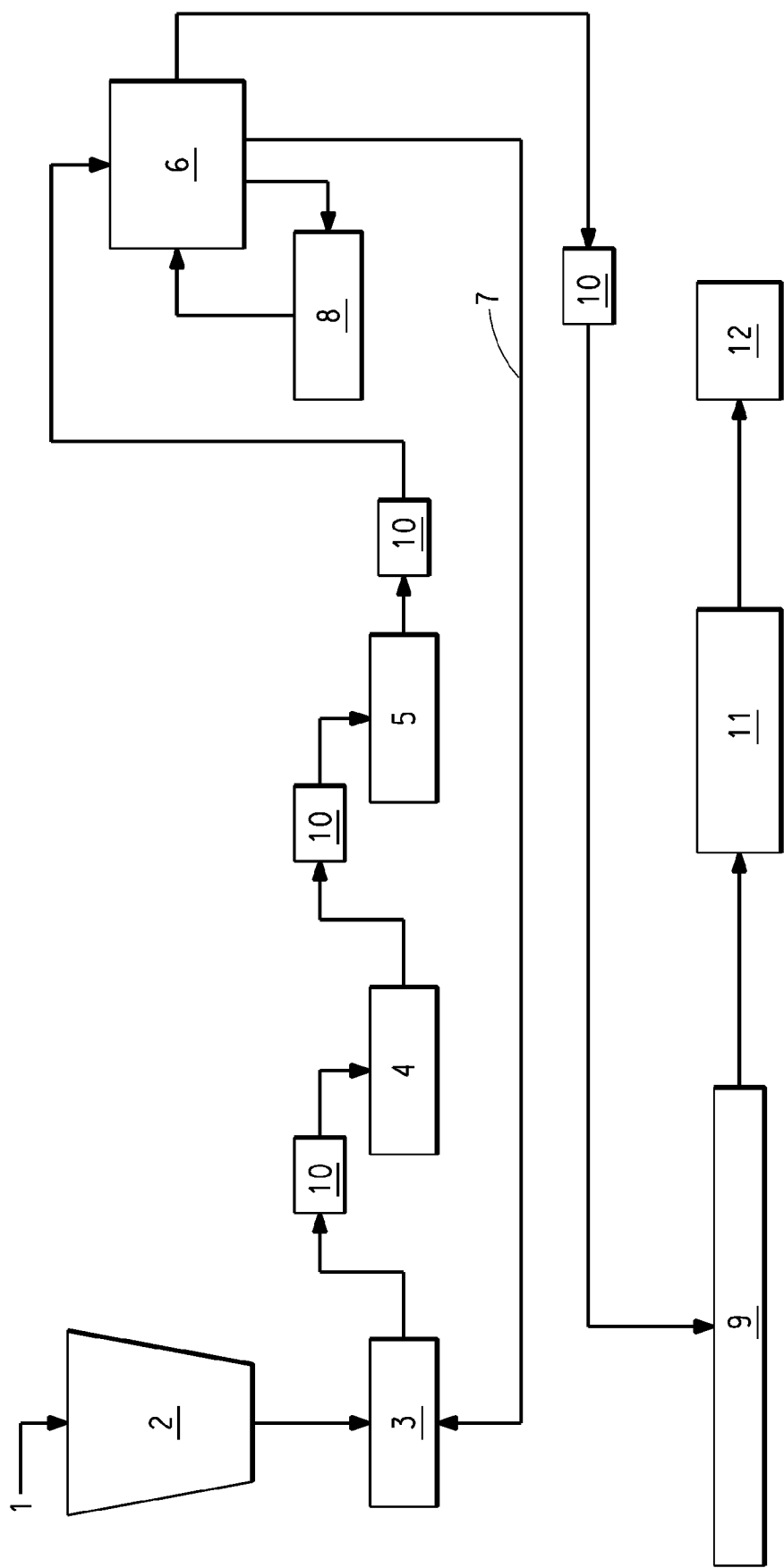
FIG. 1 is a block diagram of apparatus for performing a wet process for making "wet" pulp in accordance with the present invention.

Before the invention is described, it is useful to define certain terms in the following glossary that will have the same meaning throughout this disclosure unless otherwise indicated.

"Fiber" means a relatively flexible, unit of matter having a high ratio of length to width across its cross-sectional area perpendicular to its length. Herein, the term "fiber" is used interchangeably with the term "filament" or "end". The cross section of the filaments described herein can be any shape, but are typically circular or bean shaped. Fiber spun onto a bobbin in a package is referred to as continuous fiber or continuous filament or continuous filament yarns. Fiber can be cut into short lengths called staple fiber. Fiber can be cut into even smaller lengths called floc. Yarns, multifilament yarns or tows comprise a plurality of fibers. Yarn can be intertwined and/or twisted.

"Fibril" means a small fiber having a diameter as small as a fraction of a micrometer to a few micrometers and having a length of from about 10 to 100 micrometers. Fibrils generally extend from the main trunk of a larger fiber having a diameter of from 4 to 50 micrometers. Fibrils act as hooks or fasteners to ensnare and capture adjacent material. Some fibers fibrillate, but others do not or do not effectively fibrillate and for purposes of this definition such fibers do not fibrillate.

"Fibrillated fibrous structures" means particles of material having a stalk and fibrils extending therefrom wherein the stalk is generally columnar and about 10 to 50 microns in diameter and the fibrils are hair-like members only a fraction of a micron or a few microns in diameter attached to the stalk and about 10 to 100 microns long.

"Floc" means short lengths of fiber, shorter than staple fiber. The length of floc is about 0.5 to about 15 mm and a diameter of 4 to 50 micrometers, preferably having a length of 1 to 12 mm and a diameter of 8 to 40 micrometers. Floc that is less than about 1 mm does not add significantly to the strength of the material in which it is used. Floc or fiber that is more than about 15 mm often does not function well because the individual fibers may become entangled and cannot be adequately and uniformly distributed throughout the material or slurry. Aramid floc is made by cutting aramid fibers into short lengths without significant or any fibrillation, such as those prepared by processes described in U.S. Pat. Nos. 3,063,966, 3,133,138, 3,767,756, and 3,869,430.

"Length-weighted average" length means the calculated length from the following formula:

$$\text{Length-weighted average length} = \frac{\sum [(\text{Each Individual pulp length})^2]}{\sum [\text{Each Individual pulp length}]}$$

"Maximum dimension" of an object means the straight distance between the two most distal points from one another in the object "Staple fiber" can be made by cutting filaments into lengths of no more than 15 cm, preferably 3 to 15 cm; and most preferably 3 to 8 cm. The staple fiber can be straight (i.e., non crimped) or crimped to have a saw tooth shaped crimp along its length, with any crimp (or repeating bend) frequency. The fibers can be present in uncoated, or coated, or otherwise pretreated (for example, pre-stretched or heat-treated) form.

DETAILED DESCRIPTION OF THE INVENTION

This invention is directed to a fibrous pulp comprising a combination of polypyridobisimidazole fibrous structures and fibrous structures derived from another polymer, each of the fibrous structures having fibrils and stalks, and having an maximum dimension of no more than 15 mm, a mean length-weighted average length of no more than 2.0 mm, and the stalks and/or fibrils of the polypyridobisimidazole fibrous structures being substantially entangled with the fibrils and/or stalks of the fibrous structures derived from another polymer.

The pulp of this invention has use in articles as a reinforcement material in friction and fluid sealing materials, as a processing aid such as a thixotrope, and in filters, papers, and sheet materials. The invention is also directed to processes for making a polypyridobisimidazole combination pulp I. First Embodiment of the Inventive Process In a first embodiment, the process for making an fibrous pulp comprising a combination of polypyridobisimidazole fibrous structures and fibrous structures derived from another polymer comprises the following steps. First, pulp ingredients are combined, added or contacted together. Second, the combined pulp ingredients are mixed to a substantially uniform slurry. Third, the slurry is simultaneously refined or co-refined. Fourth, water is removed from the refined slurry.

Combining Step

In the combining step, the pulp ingredients are preferably added together in a container. In a preferred embodiment the pulp ingredients include (1) polypyridobisimidazole fiber, (2) one or more other fibrous structures, (3) optionally other additives, and (4) water.

Polypyridobisimidazole Fiber

The instant invention utilizes polypyridobisimidazole fiber. This fiber is a rigid rod polymer that is of high strength. The polypyridobisimidazole fiber has an inherent viscosity of at least 20 dl/g or at least 25 dl/g or at least 28 dl/g. Such fibers include PIPD fiber (also known as M5® fiber and fiber made from poly[2,6-diimidazo[4,5-b:4,5-e]-pyridinylene-1,4(2,5-dihydroxy)phenylene]. PIPD fiber is based on the structure:

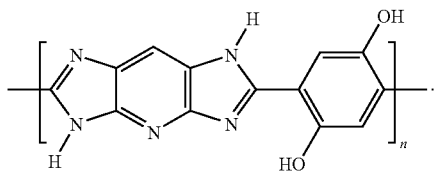

Polypyridobisimidazole fiber can be distinguished from commercially available PBI (polybenzimidazole) fiber in that PBI fiber is a polybibenzimidazole and is not a rigid rod polymer. PBI fiber has low fiber tensile strength and low tensile modulus when compared to the polypyridobisimidazole fiber used in this invention.

PIPD fibers have been reported to have the potential to have an average modulus of about 310 GPa (2100 grams/denier) and an average tenacities of up to about 5.8 GPa (39.6 grams/denier). These fibers have been described by Brew, et al., *Composites Science and Technology* 1999, 59, 1109; Van der Jagt and Beukers, *Polymer* 1999, 40, 1035; Sikkema, *Polymer* 1998, 39, 5981; Klop and Lammers, *Polymer,* 1998, 39, 5987; Hageman, et al., *Polymer* 1999, 40, 1313.

The polypyridobisimidazole fiber is added to a concentration of at least 3 weight percent of the total solids in the ingredients. In some embodiments the polypyridobisimidazole fiber is added up to about 50 weight percent. In still other embodiments the polypyridobisimidazole fiber is added in an amount of up to about 80 weight percent by weight. In a particularly desired embodiment the polypyridobisimidazole fiber is 25 to 40 weight percent of the total solids in the ingredients. This range has been found to be particularly useful in that the polypyridobisimidazole fiber is present in an amount that is believed to be the most efficient for the polypyridobisimidazole to help fibrillate the other fibrous structures in the pulp during manufacturing.

In some embodiments, the polypyridobisimidazole fiber preferably has a linear density of no more than 10 dtex and more preferably 0.8 to 2.5 dtex. In some embodiments, polypyridobisimidazole fiber also preferably has an average length along its longitudinal axis of no more than 10 cm, more preferably an average length of 0.65 to 2.5 cm, and most preferably an average length of 0.65 to 1.25 cm.

Polypyridobisimidazole Polymer

Polymers suitable for use in making the polypyridobisimidazole fiber must be of fiber-forming molecular weight in order to be shaped into fibers. The polymers can include homopolymers, copolymers, and mixtures thereof.

One method of making rigid rod polypyridoimidazole polymer is disclosed in detail in U.S. Pat. No. 5,674,969 to Sikkema et al. Polypyridoimidazole polymer may be made by reacting a mix of dry ingredients with a polyphosphoric acid (PPA) solution. The dry ingredients may comprise pyridobisimidazole-forming monomers and metal powders. The polypyridobisimidazole polymer used to make the rigid rod fibers used in the pulps of this invention should have at least 25 and preferably at least 100 repetitive units. The average number of repeat units of the polymer chains is typically in the range of from about from about 25 to about 25,000, more typically in the range of from about 100 to 1,000, even more typically in the range of from about 125 to 500, and further typically in the range of from about 150 to 300.

The polypyridobisimidazole fiber useful in most embodiments of this invention has an inherent viscosity of at least 20 dl/g. Certain embodiments of this invention desire polypyridobisimidazole fibers that have an inherent viscosity of at least 25 dl/g; other embodiments desire an inherent viscosity of at least 28 dl/g.

For the purposes of this invention, the relative molecular weights of the polypyridoimidazole polymers are suitably characterized by diluting the polymer products with a suitable solvent, such as methane sulfonic acid, to a polymer concentration of 0.05 g/dl, and measuring one or more dilute solution viscosity values at 30° C. Molecular weight development of polypyridoimidazole polymers of the present invention is suitably monitored by, and correlated to, one or more dilute solution viscosity measurements. Accordingly, dilute solution measurements of the relative viscosity ("$V_{rel}$" or "$\eta_{rel}$" or "$n_{rel}$") and inherent viscosity ("$V_{inh}$" or "$\eta_{inh}$" or "$n_{inh}$") are typically used for monitoring polymer molecular weight. The relative and inherent viscosities of dilute polymer solutions are related according to the expression $$V_{inh} = \ln(V_{rel})/C,$$

where ln is the natural logarithm function and C is the concentration of the polymer solution. $V_{rel}$ is a unitless ratio of the polymer solution viscosity to that of the solvent free of polymer, thus $V_{inh}$ is expressed in units of inverse concentration, typically as deciliters per gram ("dl/g"). Accordingly, in certain aspects of the present invention the polypyridoimidazole polymers are produced that are characterized as providing a polymer solution having an inherent viscosity of at least about 20 dl/g at 30° C. at a polymer concentration of 0.05 g/dl in methane sulfonic acid. Because the higher molecular weight polymers that result from the invention disclosed herein give rise to viscous polymer solutions, a concentration of about 0.05 g/dl polymer in methane sulfonic acid is useful for measuring inherent viscosities in a reasonable amount of time.

Exemplary pyridobisimidazole-forming monomers useful in this invention include 2,3,5,6-tetraaminopyridine and a variety of acids, including terephthalic acid, bis-(4-benzoic acid), oxy-bis-(4-benzoic acid), 2,5-dihydroxyterephthalic acid, isophthalic acid, 2,5-pyridodicarboxylic acid, 2,6-napthalenedicarboxylic acid, 2,6-quinolinedicarboxylic acid, or any combination thereof. Preferably, the pyridobisimidazole forming monomers include 2,3,5,6-tetraaminopyridine and 2,5-dihydroxyterephthalic acid. In certain embodiments, it is preferred that that the pyridoimidazole-forming monomers are phosphorylated. Preferably, phosphorylated pyridoimidazole-forming monomers are polymerized in the presence of polyphosphoric acid and a metal catalyst.

Metal powders can be employed to help build the molecular weight of the final polymer. The metal powders typically include iron powder, tin powder, vanadium powder, chromium powder, and any combination thereof.

The pyridobisimidazole-forming monomers and metal powders are mixed and then the mixture is reacted with polyphosphoric acid to form a polypyridoimidazole polymer solution. Additional polyphosphoric acid can be added to the polymer solution if desired. The polymer solution is typically extruded or spun through a die or spinneret to prepare or spin filaments.

Fibrous Structures Derived from Another Polymer

In addition to the polypyridobisimidazole fiber, the combining step also includes fibrous structures derived from another polymer. Fibrous structures not only include fibers, floc, yarn, or staple fibers, but also such things as polymer fibrids. Polymer fibrids are non-granular, fibrous or film-like, particles. In some embodiments they have a melting point or decomposition point above 320° C. Fibrids are not fibers, but they are fibrous in that they have fiber-like regions connected by webs. Fibrids have an average length of 0.2 to 1 mm with an aspect ratio of 5:1 to 10:1. The thickness dimension of the fibrid web is less than 1 or two microns and typically on the order of a fraction of a micron. The fibrids can be prepared by any method including using a fibridating apparatus of the type disclosed in U.S. Pat. No. 3,018,091 where a polymer solution is precipitated and sheared in a single step. In many embodiments fibrids are useful only if they are used prior to being dried, since some fibrids they will lose their film-like character if dried.

The fibrous structures derived from another polymer are added to a concentration of at least about 20 weight percent of the total solids in the ingredients. In some embodiments the fibrous structures derived from another polymer are added up to about 60 weight percent. In still other embodiments the fibrous structures derived from another polymer are added in an amount of up to about 75 weight percent by weight. In a particularly desired embodiment the fibrous structures derived from another polymer are 60 to 97 weight percent of the total solids in the ingredients.

The fibrous structures derived from another polymer preferably have an average length of no more than 10 cm, more preferably 0.5 to 5 cm, and most preferably 0.6 to 2 cm. If the fibrous structures derived from another polymer are fibers, those fibers have a linear density of no more than 10 dtex. Prior to combining the pulp ingredients together, any fibrous structures in the form of continuous filaments can be cut into shorter fibers, such as staple fibers or floc.

Other Fibrous Structures Polymer

The polymer used in the fibrous structures derived from another polymer can include thermoplastic, thermoset, liquid crystalline and other polymers. The polymer can include homopolymers, copolymers, and mixtures thereof.

Thermoset polymers generally have precursors that are heated to an appropriate temperature for a short time so that they will flow as a viscous liquid and can be formed into fibers and other shaped structures. The liquid polymer then typically undergoes a chemical cross-linking reaction then causes the liquid to solidify or "set" to form an infusible mass that is not reversible with heat.

Thermoplastic polymers when heated, flow in the manner of a highly viscous liquid; they can be solidified by cooling and upon reheating the return to a liquid state. Polymers suitable for use in making the thermoplastic fiber must be of fiber-forming molecular weight in order to be shaped into fibers. Typical thermoplastic polymers can be made to flow and solidified reversibly time and time again by subsequent heating and cooling. In the heated viscous liquid state thermoplastic polymers can be formed into fibers and other shaped structures. The liquid polymer is then typically cooled to solidify the fibers and shaped structures.

Representative polymer used in the fibrous structures derived from another polymer include polyolefins including polypropylenes, polyethylenes, higher chain polyolefins, and mixtures thereof; polyesters including polyethylene terephthalates, polyethylene napthalates, and mixtures thereof; acrylics; polyamides including nylons; aromatic polyamides including para-ararmids and meta-aramids; cellulosic and cellulose derivative polymers, fluoropolymers including polytetrafluoroethylenes; polybenzazoles, polyimides, polyamide-imides, other aromatic and aliphatic polymers and mixtures thereof.

Optional Other Additives

Other additives can optionally be added as long as they stay suspended in the slurry in the mixing step and do not significantly change the effect of the refining step on the mandatory solid ingredients listed above. Suitable additives include pigments, dyes, anti-oxidants, flame-retardant compounds, and other processing and dispersing aids. Preferably, the pulp ingredients do not include asbestos. In other words, the resulting pulp is asbestos free or without asbestos.

Water

Water is added to a concentration of 95 to 99 wt % of the total ingredients, and preferably 97 to 99 wt % of the total ingredients. Further, the water can be added first. Then other ingredients can be added at a rate to optimize dispersion in the water while simultaneously mixing the combined ingredients.

Mixing Step

In the mixing step, the ingredients are mixed to a substantially uniform slurry. By "substantially uniform" is meant that random samples of the slurry contain the same wt % of the concentration of each of the starting ingredients as in the total ingredients in the combination step plus or minus 10 wt %, preferably 5 wt % and most preferably 2 wt %. For instance, if the concentration of the solids in the total mixture is 50 wt % polypyridobisimidazole fiber plus 50 wt % of fiber derived from another polymer, then a substantially uniform mixture in the mixing step means each random sample of the slurry has (1) a concentration of the fiber derived from another polymer fiber of 50 wt % plus or minus 10 wt %, preferably 5 wt % and most preferably 2 wt % and (2) a concentration of polypyridobisimidazole fiber of 50 wt % plus or minus 10 wt %, preferably 5 wt % and most preferably 2 wt %. The mixing can be accomplished in any vessel containing rotating blades or some other agitator. The mixing can occur after the ingredients are added or while the ingredients are being added or combined.

Refining Step

In the refining step the pulp ingredients are simultaneously co-refined, converted or modified as follows. The fiber derived from another polymer and the polypyridobisimidazole fiber are fibrillated, cut and masticated to irregularly shaped fibrous structures having stalks and fibrils. All solids are dispersed such that the refined slurry is substantially uniform. "Substantially uniform" is as defined above. The refining step preferably comprises passing the mixed slurry through one or more disc refiner, or recycling the slurry back through a single refiner. By the term "disc refiner" is meant a refiner containing one or more pair of discs that rotate with respect to each other thereby refining ingredients by the shear action between the discs. In one suitable type of disc refiner, the slurry being refined is pumped between closely spaced circular rotor and stator discs rotatable with respect to one another. Each disc has a surface, facing the other disc, with at least partially radially extending surface grooves. A preferred disc refiner that can be used is disclosed in U.S. Pat. No. 4,472,241. In a preferred embodiment, the plate gap setting for the disc refiner is a maximum of 0.18 mm and preferably the gap setting is 0.13 mm or lower, to a practical minimum setting of about 0.05 mm.

If necessary for uniform dispersion and adequate refining, the mixed slurry can be passed through the disc refiner more than once or through a series of at least two disc refiners. When the mixed slurry is refined in only one refiner, there is a tendency for the resulting slurry to be inadequately refined and non uniformly dispersed. Conglomerates or aggregates entirely or substantially of one solid ingredient, or the other, or both, can form rather than being dispersed forming a substantially uniform dispersion. Such conglomerates or aggregates have a greater tendency to be broken apart and dispersed in the slurry when the mixed slurry is passed through the refiner more than once or passed through more than one refiner. Optionally, the refined slurry may be passed through a screen to segregate long fibers or clumps, which may be recycled through one or more refiners until cut to acceptable lengths or concentration.

Because a substantially uniform slurry containing multiple ingredients is co-refined in this step of the process, any one type of pulp ingredient (for example, polypyridobisimidazole fiber) is refined into a pulp in the presence of all the other types of pulp ingredients (for example, fiber derived from another polymer) while those other ingredients are also being refined. This co-refining of pulp ingredients forms a pulp that is superior to a pulp blend generated by merely mixing two pulps together. Adding two pulps and then merely mixing them together does not form the substantially uniform and intimately connected fibrous components of the pulp generated by co-refining of pulp ingredients into pulp in accordance with the present invention.

Removing Step

Then water is removed from the refined slurry. The water can be removed by collecting the pulp on a dewatering device such as a horizontal filter, and if desired, additional water can be removed by applying pressure or squeezing the pulp filter cake. The dewatered pulp can optionally then be dried to a desired moisture content, and/or can be packaged or wound up on rolls. In some preferred embodiments, the water is removed to a degree that the resulting pulp can be collected on a screen and wound up into rolls. In some embodiments, no more than about 60 total wt % water being present is a desired amount of water and preferably 4 to 60 total wt % water. However, in some embodiments, the pulp can retain more water, so higher amounts of total water, as much as 75 total wt % water, will be present.

Figure 2:
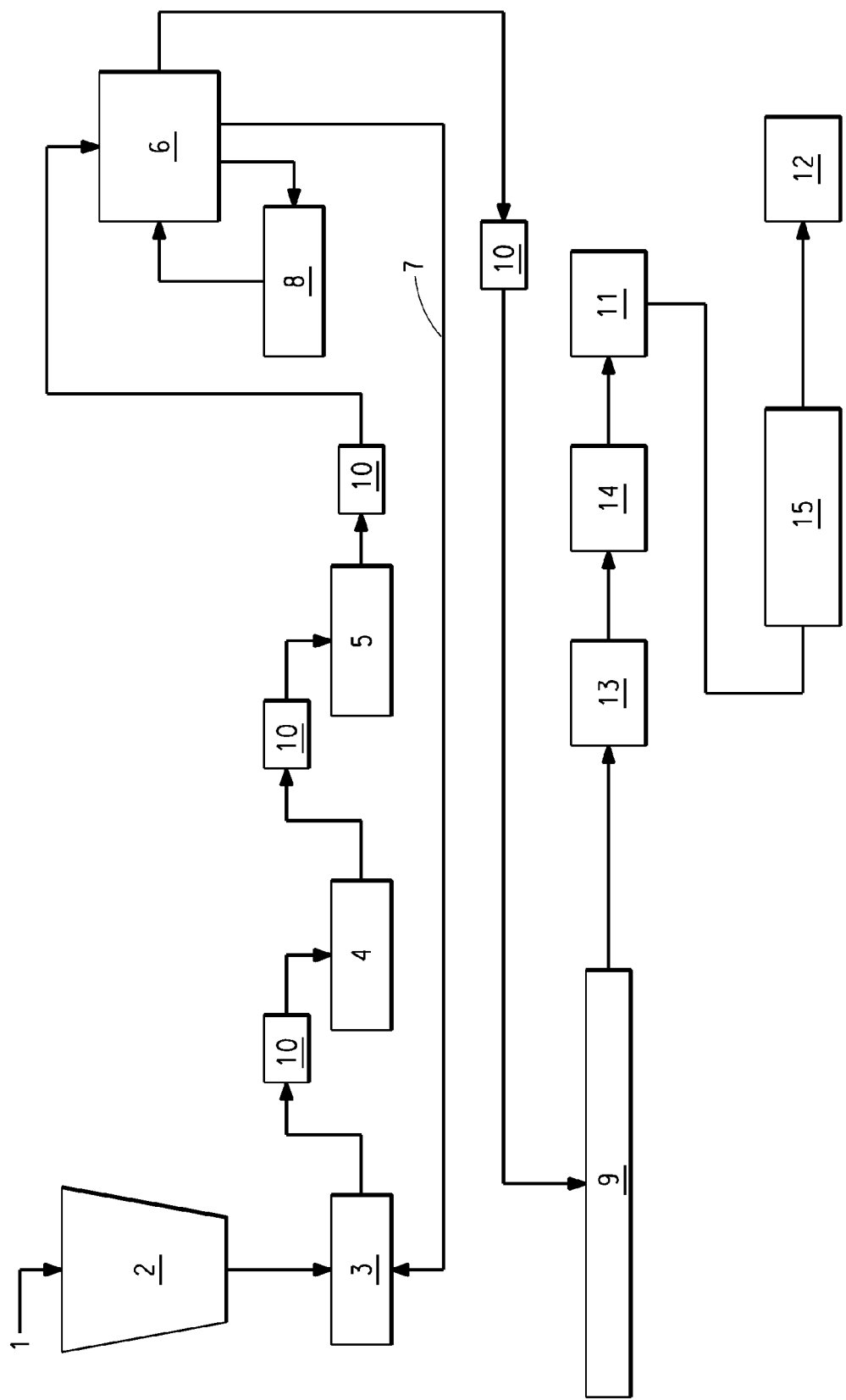
FIG. 2 is a block diagram of apparatus for performing a dry process for making "dry" pulp in accordance with the present invention.

FIGS. 1 and 2

This process will now be described in reference to FIGS. 1 and 2. Throughout this detailed description, similar reference characters refer to similar elements in all figures of the drawings.

Referring to FIG. 1, there is a block diagram of an embodiment of a wet process for making "wet" pulp in accordance with the present invention. Pulp ingredients 1 are added to container 2. Container 2 is provided with an internal mixer, similar to a mixer in a washing machine. The mixer disperses the ingredients into the water creating the substantially uniform slurry. The mixed slurry is transferred to a first refiner 3 which refines the slurry. Then, optionally, the refined slurry can be transferred to a second refiner 4, and optionally then to a third refiner 5. Three refiners are illustrated but any number of refiners can be used depending on the degree of uniformity and refining desired. After the last refiner in the series of refiners, the refined slurry is optionally transferred to a filter or sorter 6 that allows slurry with dispersed solids below a chosen mesh or screen size to pass and recirculates dispersed solids larger than a chosen mesh or screen size back to one or more of the refiners such as through line 7 or to a refiner 8 dedicated to refine this recirculated slurry from which refined slurry is again passed to the filter or sorter 6. Suitably refined slurry passes from the filter or sorter 6 to a horizontal water vacuum filter 9 which removes water. The slurry can be transferred from point to point by any conventional method and apparatus such as with the assistance of one or more pump 10. Then the pulp is conveyed to a dryer 11 that removes more water until the pulp has the desired concentration of water. Then the refined pulp is packaged in a baler 12.

Referring to FIG. 2, there is a block diagram of an embodiment of a dry process for making "dry" pulp in accordance with the present invention. This dry process is the same as the wet process except after the horizontal water vacuum filter 9. After that filter, the pulp goes through a press 13 which removes more water until the pulp has the desired concentration of water. Then the pulp goes through a fluffer 14 to fluff the pulp and then a dryer 11 to remove more water. Then, the pulp is passed through a rotor 15 and packaged in a baler 12.

II. Second Embodiment of the Inventive Process

In a second embodiment, the process for making the pulp of this invention is the same as the first embodiment of the process described above with the following differences.

Prior to combining all ingredients together, either the polypyridobisimidazole fiber, or the fibrous structures derived from another polymer or both the polypyridobisimidazole fiber and fibrous structures derived from another polymer, may need to be shortened. This is done by combining water with the fiber ingredient. Then the water and fiber are mixed to form a first suspension and processed through a first disc refiner to shorten the fiber. The disc refiner cuts the fiber to an average length of no more than 10 cm. The disc refiner will also partially fibrillate and partially masticate the fiber. The other fiber, that was not previously added, can be shortened this way too forming a second processed suspension. Then the other fiber (or the second suspension, if processed in water) is combined with the first suspension.

More water is added before or after, or when, other ingredients are added, if necessary, to increase the water concentration to 95-99 wt % of the total ingredients. After all ingredients are combined, they can be mixed, if necessary, to achieve a substantially uniform slurry.

The ingredients in the slurry are then co-refined together, i.e., simultaneously. This refining step includes fibrillating, cutting and masticating solids in the suspension such that all or substantially all of the polypyridobisimidazole fiber and the fiberous structures derived from another polymer is converted to irregularly shaped fibrillated fibrous structures. This refining step also disperses all solids such that the refined slurry is substantially uniform. Then water is removed as in the first embodiment of the process. Both processes produce the same or substantially the same fibrous pulp comprising a combination of polypyridobisimidazole fibrous structures and fibrous structures derived from another polymer.

The Inventive Pulp

The resulting product produced by the process of this invention is an fibrous pulp comprising a combination of polypyridobisimidazole fibrillated fibrous structures and fibrillated fibrous structures derived from another polymer, for use as reinforcement material in products. The pulp comprises (a) irregularly shaped, fibrillated polypyridobisimidazole fibrous structures, (b) irregularly shaped, irregularly shaped, fibrillated fibrous structures derived from another polymer, (c) optionally other minor additives, and (d) water.

The concentration of the separate ingredient components in the pulp correspond, of course, to the concentrations described beforehand of the corresponding ingredients used in making the pulp.

The irregularly shaped, fibrillated fibrous structures derived from another polymer and polypyridobisimidazole fibrillated fibrous structures have stalks and fibrils. The fibrils and/or stalks of the fibrillated fibrous structures derived from another polymer are substantially entangled with the polypyridobisimidazole fibrils and/or stalks. The fibrils are important and act as hooks or fasteners or tentacles which adhere to and hold adjacent particles in the pulp and final product thereby providing integrity to the final product.

The fibrillated fibrous structures derived from another polymer and the polypyridobisimidazole fibrillated fibrous structures preferably have an average maximum dimension of no more than 7 mm, more preferably 0.1 to 4 mm, and most preferably 0.1 to 3 mm. The fibrillated fibrous structures derived from another polymer fiber and polypyridobisimidazole fibrillated fibrous structures preferably have a length-weighted average length of no more than 2.0 mm, more preferably 0.5 to 2.0 mm, and most preferably 0.75 to 1.2 mm.

The pulp of this invention preferably has a high moisture content. In some embodiments, the moisture content is greater than about 10 percent by weight. In other embodiments, the moisture content is greater than about 20 percent by weight.

The fibrous pulp comprising a combination of polypyridobisimidazole fibrous structures and fibrous structures derived from another polymer, is without substantial aggregates or conglomerates of the same material. Further, the pulp has a Canadian Standard Freeness (CSF) as measured per TAPPI test T 227 om-92, which is a measure of its drainage characteristics, of 100 to 700 ml, and preferably 250 to 450 ml.

Surface area of pulp is a measure of the degree of fibrillation and influences the porosity of the product made from the pulp. In some embodiments, the pulp of this invention has a surface area of about 3 to 12 square meters per gram. In some preferred embodiments, the surface area of pulp of this invention is 7 to 11 square meters per gram.

It is believed that the fibrillated fibrous structures, dispersed substantially homogeneously throughout the reinforcement material, and the friction and fluid sealing materials, provide, by virtue of the high temperature characteristics of the polypyridobisimidazole polymers and the fibrillation propensity of the polypyridobisimidazole fibers, many sites of reinforcement and increased wear resistance. When co-refined, the blending of the polypyridobisimidazole fibrillated fibrous structures and fibrillated fibrous structures derived from another polymer materials is so intimate that in a friction or fluid sealing material there is always some polypyridobisimidazole fibrous structures close to the fibrous structures derived from another polymer, so the stresses and abrasion of service are always shared.

Fluid Sealing Material

The invention is further directed to fluid sealing material and processes for making the fluid sealing materials. Fluid sealing materials are used in or as a barrier to prevent the discharge of fluids and/or gases and used to prevent the entrance of contaminants where two items are joined together. An illustrative use for fluid sealing material is in gaskets. The fluid sealing material comprises a binder; optionally at least one filler; and a fibrous reinforcement material comprising the pulp of this invention. Suitable binders include nitrile rubber, butadiene rubber, neoprene, styrene-butadiene rubber, nitrile-butadiene rubber, and mixtures thereof. The binder can be added with all other starting materials. The binder is typically added in the first step of the gasket production process, in which the dry ingredients are mixed together. Other ingredients optionally include uncured rubber particles and a rubber solvent, or a solution of rubber in solvent, to cause the binder to coat surfaces of the fillers and pulp. Suitable fillers include barium sulfate, clays, talc, and mixtures thereof.

Suitable processes for making fluid sealing materials are, for example, a beater-add process or wet process where the gasket is made from a slurry of materials, or by what is called a calendering or dry process where the ingredients are combined in an elastomeric or rubber solution.

Friction Material

The pulp of the present invention can be used as a reinforcement material in friction materials. By "friction materials" is meant materials used for their frictional characteristics such as coefficient of friction to stop or transfer energy of motion, stability at high temperatures, wear resistance, noise and vibration damping properties, etc. Illustrative uses for friction materials include brake pads, brake blocks, dry clutch facings, clutch face segments, brake pad backing/insulating layers, automatic transmission papers, wet brake and other industrial friction papers.

In view of this new use, the invention is further directed to friction material and processes for making the friction material. Specifically, the friction material comprises a friction modifier; optionally at least one filler; a binder; and a fibrous reinforcement material comprising the fibrous pulp of this invention. Suitable friction modifiers are metal powders such as iron, copper and zinc; abrasives such as oxides of magnesium and aluminum; lubricants, such as synthetic and natural graphites, and sulfides of molybdenum and zirconium; and organic friction modifiers such as synthetic rubbers and cashew nut shell resin particles. Suitable binders are thermosetting resins such as phenolic resins (i.e., straight (100%) phenolic resin and various phenolic resins modified with rubber or epoxy), melamine resins, epoxy resins and polyimide resins, and mixtures thereof. Suitable fillers include barite, whiting, limestone, clay, talc, various other magnesium-aluminum-silicate powders, wollastonite, attapulgite, and mixtures thereof.

The actual steps for making the friction material can vary, depending on the type of friction material desired. For example, methods for making molded friction parts generally involve combining the desired ingredients in a mold, curing the part, and shaping, heat treating and grinding the part if desired. Automotive transmission and friction papers generally can be made by combining the desired ingredients in a slurry and making a paper on a paper machine using conventional paper making processes.

Many other applications of the pulp are possible, including its use as a processing aid such as a thixotrope or as use as a filter material. When used as a filter material typically the pulp of this invention is combined with a binder and a molded shape, sheet or paper product is made by conventional methods.

TEST METHODS

The following test methods were used in the following Examples.

Canadian Standard Freeness (CSF) was measured as described in TAPPI method T 227 in conjunction with optical microscopy. CSF measures the drainage rate of a dilute pulp suspension. It is a useful test to assess the degree of fibrillation.

Average fiber lengths, including Length-weighted average length, were determined using a Fiber Quality Analyzer (sold by OpTest Equipment Inc., 900 Tupper St., Hawkesbury, ON, K6A 3S3 Canada) following TAPPI test method T 271. Data obtained from conduct of that test are expressed as Canadian Freeness Numbers, which represent the milliliters of water which drain from an aqueous slurry under specified conditions. A large number indicates a high freeness and a high tendency for water to drain. A low number indicates a tendency for the dispersion to drain slowly. The freeness is inversely related to the degree of fibrillation of the pulp, since greater numbers of fibrils reduce the rate at which water drains through a forming paper mat.

Temperature: All temperatures are measured in degrees Celsius (° C.).

Denier is measured according to ASTM D 1577 and is the linear density of a fiber as expressed as weight in grams of 9000 meters of fiber. The denier is measured on a Vibroscope from Textechno of Munich, Germany. Denier times (10/9) is equal to decitex (dtex).

EXAMPLES

This invention will now be illustrated by the following specific examples. All parts and percentages are by weight unless otherwise indicated. Examples prepared according to the process or processes of the current invention are indicated by numerical values.

Example 1

In this example of the invention, the pulp of this invention was produced from a feedstock of polypyridobisimidazole staple fiber made from PIPD polymer and marketed by Magellan Systems International, having offices in Richmond, Va., under the trademark M5®. The staple had a cut length less than 50 mm and a filament linear density of about 2 dpf (2.2 dtex per filament). Para-aramid fiber in the form of commercially available KEVLAR® brand floc, Style 1F178, having a 6.4 mm cut length, was obtained from E. I. de Pont de Nemours and Company with offices in Wilmington, Del.

The PIPD staple and water together were fed directly into a Sprout-Waldron 30.5 cm Single Disc Refiner using a 0.13 mm plate gap setting and pre-pulped to reach an acceptable processing length in the range of 13 mm.

The pre-pulped PIPD fiber and the cut para-aramid fiber plus water were then combined into a highly agitated mixing tank at a solids concentration of 75 wt % para-aramid fiber and 30 wt % PIPD staple and mixed to form a uniform, pumpable slurry of about 2-3 wt % of the total ingredients concentration. The slurry was then recirculated and co-refined through a Sprout-Waldron 12" Single Disc Refiner.

The refiner simultaneously fibrillated, cut, and masticated both the para-aramid fiber and the PIPD staple to irregularly shaped fibrous structures having stalks and fibrils, and dispersed all solids such that the refined slurry was substantially uniform, substantially uniform being as previously defined.

This refined slurry was then filtered using a filter bag and was dewatered through pressing and placed in large ZIPLOC® type storage bags. The fibrous structures had an average maximum dimension of no more than 5 mm and a length-weighted average of no more than 1.3 mm.

Example 2

Another pulp of this invention was produced using the same procedure as in Example 1 with the exception that the mixture consisted of 50 wt % 1.5 dpf (1.7 dtex per filament) Nomex fiber cut to a length of 12.7 mm (obtained from E. I. de Pont de Nemours and Company with offices in Wilmington, Del., USA.) and 50 wt % of the PIPD fiber feedstock from Example 1. The fibrous structures had an average maximum dimension of no more than 5 mm and a length-weighted average of no more than 1.3 mm.

Example 3

Another pulp of this invention was produced using the same procedure as in Example 1 with the exception that the mixture consisted of 60 wt % 1.7 dtex per filament PBO fiber having a cut length of 12.7 mm (sold by Toyobo Co., Ltd., Zylon Department, 2-2-8 Dojima-Hama, Kita-Ku Osaka). and 60 wt % of the PIPD fiber feedstock from example 1. The fibrous structures had an average maximum dimension of no more than 5 mm and a length-weighted average of no more than 1.3 mm.

Example 4

Another pulp of this invention was produced using the same procedure as in Example 1 with the exception that the mixture consisted of 50 wt % meta-aramid fibrids made from poly (meta-phenylene isophthalamide) as described in U.S. Pat. No. 3,756,908, with a CSF value of about 488 ml and length weighted mean length of 0.77 mm and 50 wt % of the PIPD fiber feedstock from example 1. The fibrous structures had an average maximum dimension of no more than 5 mm and a length-weighted average of no more than 1.3 mm.

Example 5

Disc brake pads incorporating the pulp of this invention are made in the following manner. Approximately 20 kilograms of a non-asbestos-containing base compound powder comprising a mixture of 7 wt % cashew nut shell resin, 17 wt % inorganic fillers, 21 wt % graphite, coke and lubricants, 18 wt % inorganic abrasives, and 16 wt % soft metals are mixed together for 10 to 20 minutes in a 50-liter Littleford mixer. The mixer has two high-speed choppers with blades of the "stars and bars" configuration and a slower rotating plough.

5 kilograms of the well-blended base compound powder are then combined with the pulp of this invention in an amount of 3.8 wt %, based on the combined weight of the compound powder and the pulp. The pulp is then dispersed in the base compound powder by mixing for an additional 5 to 10 minutes. Once mixed, the resulting brake pad composition has a normal visual appearance with the fiber well dispersed in and completely coated with the base compound powders, with essentially no detectable balling up of the pulp or segregation of any constituents.

The brake pad composition is then poured into a single-cavity steel mold for a front disc brake pad and cold pressed to a standard thickness of about ⅝ inch (16 mm) and then removed from the mold to form a pre-formed brake pad having an approximate weight of 200 grams. Twelve replicate pre-forms are made. The pre-forms are then placed in two multi-cavity molds, placed in a commercial press, and press-cured (the binder phenolic cross-linking and reacting) at 300° F. (149° C.) for about 15 minutes, with periodic pressure release to allow phenolic reaction gases to escape, followed by lightly constrained oven curing at 340° F. (171° C.) for 4 hours to complete the phenolic binder crosslinking. The cured, molded pad is then ground to the desired thickness of about half an inch (13 mm).

Example 6

This example illustrates how the pulp of this invention can be incorporated into a beater-add gasket for sealing applications. Water, rubber, latex, fillers, chemicals, and the pulp of this invention are combined in desired amounts to form a slurry. On a circulating wire sieve (such as a paper machine screen or wire), the slurry is largely drained of its water content, is dried in a heating tunnel, and is vulcanized on heated calender rolls to form a material having a maximum thickness of around 2.0 mm. This material is compressed in a hydraulic press or two-roll calender, which increases the density and improves sealability.

Such beater-add gasket materials generally do not have as good sealability as equivalent compressed-fiber materials and are best suited for moderate-pressure high-temperature applications. Beater-add gaskets find applicability in the making of auxiliary engine gaskets or, after further processing, cylinder head gaskets. For this purpose, the semi-finished product is laminated onto both sides of a spiked metal sheet and is physically fixed in place by the spikes.

Example 7

This example illustrates how the pulp of this invention can be incorporated into a gasket made by a calendering process. The same ingredients as in Example 6, minus the water, are thoroughly dry mixed together and are then blended with a rubber solution prepared using an appropriate solvent.

After mixing, the compound is then generally conveyed batchwise to a roll calender. The calender consists of a small roll that is cooled and a large roll that is heated. The compound is fed and drawn into the calender nip by the rotary movement of the two rolls. The compound will adhere and wrap itself around the hot lower roll in layers generally about 0.02 mm thick, depending on the pressure, to form a gasketing material made from the built-up compound layers. In so doing, the solvent evaporates and vulcanization of the elastomer commences.

Once the desired gasketing material thickness is reached, the rolls are stopped and the gasketing material is cut from the hot roll and cut and/or punched to the desired size. No additional pressing or heating is required, and the material is ready to perform as a gasket. In this manner gaskets up to about 7 mm thick can be manufactured. However, most gaskets made in this manner are much thinner, normally being about 3 mm or less in thickness.

Example 8

This example illustrates how the pulp of this invention can be incorporated into a automatic transmission paper application. A slurry containing desirable amounts of the pulp of this invention, clay, latex, friction modifiers such as silica and carbon, and diatomaceous is used to form a paper on a paper machine. From the paper, a ring is stamped and the object is soaked in a solution of a binder resin such as phenolic resin. Upon heating to remove residual solvent and to cure the resin, the ring is adhered to a metal plate used in a automatic transmission.

What is claimed is:

1. A process for making a fibrous pulp comprising fibrillated polypyridobisimidazole fibrous structures and fibrous structures derived from another polymer, comprising:
   (a) combining pulp ingredients including:
      (1) rigid rod polypyridobisimidazole fiber having an average length of no more than 10 cm and being 3 to 40 weight percent of the total solids in the ingredients;
      (2) fiber derived from another polymer that is capable of being fibrillated and having an average length of no more than 10 cm and being 60 to 97 weight percent of the total solids in the ingredients; and
      (3) water;
   (b) mixing the ingredients to a substantially uniform slurry;
   (c) co-refining the slurry by simultaneously:
      (1) fibrillating, cutting and masticating the fiber in the pulp ingredients to form irregularly shaped fibrillated fibrous structures with stalks and fibrils; and
      (2) dispersing all solids such that the refined slurry is substantially uniform; and
   (d) removing water from the refined slurry,
   thereby producing a fibrillated pulp with the fibrillated polypyridobisimidazole fibrous structures and fibrous structures derived from another polymer, the fibrous structures having an average maximum dimension of no more than 5 mm, a length-weighted average length of no more than 1.3 mm,
   the fibrils and/or stalks of the polypyridobisimidazole fibrous structures being substantially entangled with the fibrils and/or stalks of the fibrous structures derived from another polymer.

2. The process of claim 1, wherein the fiber derived from another polymer has a linear density of no more than 10 dtex; and the polypyridobisimidazole fiber has a linear density of no more than 2.5 dtex.

3. The process of claim 1, wherein the pulp is without substantial aggregates of the same material.

4. The process of claim 1, wherein the fiber derived from another polymer is a fiber derived from a polymer selected from the group of aramid, polybenzazole, polyimide, polyamide-imide, acrylic, cellulose and its derivatives, liquid crystalline polyesters, thermoset, thermoplastic, and mixtures thereof.

5. The process of claim 1, wherein the refining step comprises passing the mixed slurry through a series of disc refiners.

6. A process for making an fibrous pulp comprising fibrillated polypyridobisimidazole fibrous structures and fibrous structures derived from another polymer, comprising:
(a) combining ingredients including water and a first fiber from the group consisting of:
 (1) rigid rod polypyridobisimidazole fiber having an average length of no more than 10 cm and being 3 to 40 weight percent of the total solids in the ingredients; and
 (2) fiber derived from another polymer that is capable of being fibrillated and having an average length of no more than 10 cm and being 60 to 97 weight percent of the total solids in the ingredients;
(b) mixing the combined ingredients to a substantially uniform suspension;
(c) refining the suspension in a disc refiner thereby cutting the first fiber to have an average length of no more than 10 cm, and fibrillating and masticating at least some of the first fiber to irregularly shaped fibrillated fibrous structures;
(d) combining ingredients including the refined suspension, the second fiber of the group of (a) (1 and 2) having an average length of no more than 10 cm, and water, if necessary, to increase the water concentration to 95-99 weight percent of the total ingredients;
(e) mixing the ingredients, if necessary, to form a substantially uniform suspension;
(d) co-refining the mixed suspension by simultaneously:
 (1) fibrillating, cutting and masticating the fiber in the pulp ingredients to form irregularly shaped fibrillated fibrous structures with stalks and fibrils; and
 (2) dispersing all solids such that the refined slurry is substantially uniform; and
(f) removing water from the refined slurry,
thereby producing a fibrillated pulp with the fibrillated polypyridobisimidazole fibrous structures and fibrous structures derived from another polymer, the fibrous structures having an average maximum dimension of no more than 5 mm, a length-weighted average length of no more than 1.3 mm,
the fibrils and/or stalks of the polypyridobisimidazole fibrous structures being substantially entangled with the fibrils and/or stalks of the fibrous structures derived from another polymer.

7. The process of claim 6, wherein the fiber derived from another polymer is a fiber derived from a polymer selected from the group of aramid, polybenzazole, polyimide, polyamide-imide, acrylic, cellulose and its derivatives, liquid crystalline polyesters, thermoset, thermoplastic, and mixtures thereof.

* * * * *